United States Patent [19]

Takatsu

[11] 4,096,927
[45] Jun. 27, 1978

[54] SHOCK ABSORBER

[76] Inventor: Suehiro Takatsu, 3-21-6, Marunouchi, Naka-ku, Nagoya-shi, Aichi-ken, Japan

[21] Appl. No.: 788,766

[22] Filed: Apr. 19, 1977

[30] Foreign Application Priority Data

Jun. 11, 1976  Japan .................................. 51-68363

[51] Int. Cl.$^2$ .............................................. F16F 9/30
[52] U.S. Cl. ...................................... 188/268; 92/30; 188/322; 267/116; 267/140; 293/DIG. 2; 293/89
[58] Field of Search ............... 188/1 C, 268, 321, 322; 403/149, 146; 92/30, 84, 187; 293/DIG. 2, 84, 85, 88, 89, 99; 267/114, 116, 139, 140, 152, 35

[56] References Cited

U.S. PATENT DOCUMENTS

| | | | |
|---|---|---|---|
| 1,811,152 | 6/1931 | Seversky | 293/DIG. 2 |
| 3,584,541 | 6/1971 | Cunningham | 92/30 X |
| 3,947,058 | 3/1976 | Laporte | 188/1 C |

FOREIGN PATENT DOCUMENTS

| | | | |
|---|---|---|---|
| 2,255,796 | 7/1975 | France | 293/DIG. 2 |
| 2,310,574 | 9/1973 | Germany | 293/88 |
| 211,448 | 4/1968 | U.S.S.R. | 267/152 |

Primary Examiner—George E. A. Halvosa
Attorney, Agent, or Firm—Connolly and Hutz

[57] ABSTRACT

Shock absorber characterized in that a hollow tubular cushion is placed within a cylinder with one end closed. A plunger fits within the open end of the cylinder to compress and deform the cushion. Shock applied to the plunger is mitigated by the resistance provided by the cushion. Resistance means between the cylinder and the plunger inhibits sudden return of the plunger to its original position while providing little resistance on the down stroke of the plunger.

7 Claims, 8 Drawing Figures

SHOCK ABSORBER

REFERENCE TO RELATED APPLICATION

The present application is related to another application entitled "Shock Absorber" filed on Apr. 9, 1977, and given Ser. No. 788,770.

BACKGROUND OF THE INVENTION

The present invention relates to a shock absorber of the type installed on automobiles, and more particularly to a shock absorber that effectively absorbs shocks to an automobile in case of collision.

Various shock absorbers for mitigating a sudden shock which utilize hydraulic or pneumatic pressure are known, but it is difficult for them to maintain their required characteristic for a long period. Also, many of these shock absorbers are ineffective in the event of an accident. Meanwhile they require complicated mechanisms to enable gradual recovery from deformation by which a shock is absorbed.

SUMMARY OF THE INVENTION

The primary object of the present invention is to provide an appropriate shock absorber for mounting to a vehicle for absorbing the shock of collision.

Another object of the present invention is to provide a shock absorber which comprises a simple mechanism for preventing sudden recovery of the cushion from deformation.

Still another object of the present invention is to provide a shock absorber in which an effective buckling of the cushion mitigates the shock.

Still another object of the present invention is to provide a shock absorber characterized in that a cushion is held within a cylinder, the cushion is compressed and deformed by the pressure of a plunger going into the open end of said cylinder, and the return of the plunger is arrested by saw-teeth provided on the internal wall of the cylinder thereby preventing a sudden recovery of the cushion from deformation.

BRIEF DESCRIPTION OF THE DRAWINGS

Novel features and advantages of the present invention in addition to those mentioned above will become apparent to those skilled in the art from reading of the following detailed description in conjunction with the accompanying drawings wherein.

DETAILED DESCRIPTION OF THE INVENTION

Figure 1:
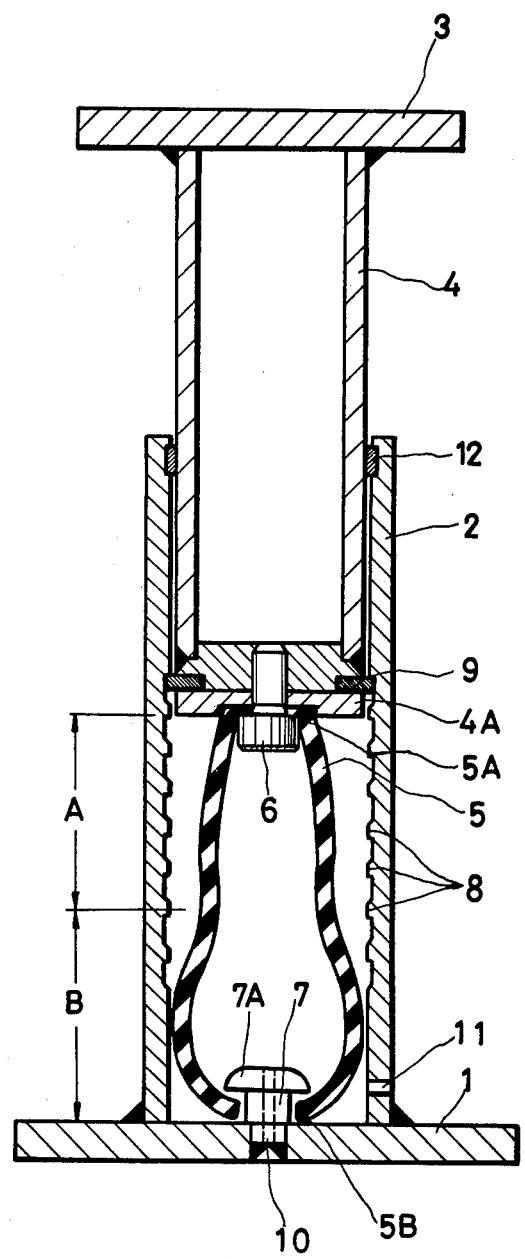
FIG. 1 is a longitudinal sectional view of a shock absorber according to the present invention.
Figure 2:
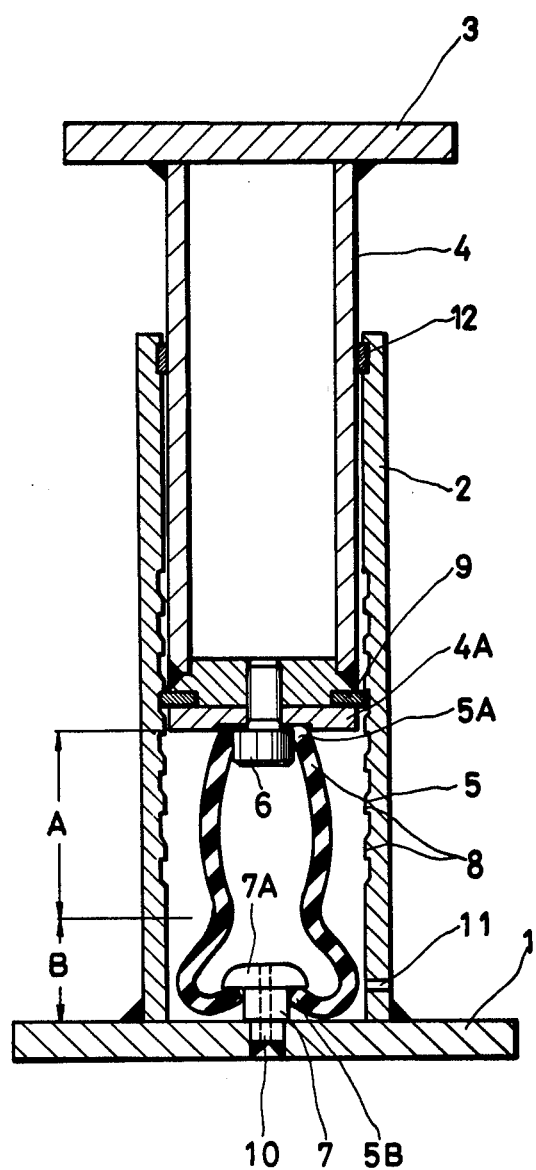
FIG. 2 is a longitudinal sectional view of the shock absorber of FIG. 1 with the cushion in a deformed state.
Figure 3:
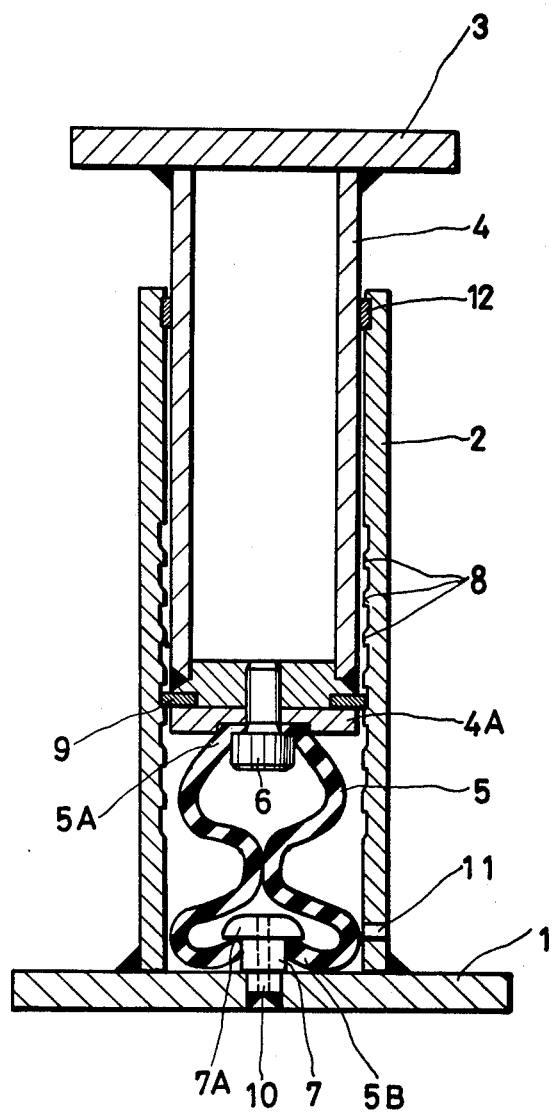
FIG. 3 is a longitudinal sectional view of the shock absorber of FIG. 1 with the cushion in its advanced state of deformation.

FIGS. 1 to 3 illustrate a shock absorber according to the present invention. A base plate 1 is fixed to a cylinder 2 and a hollow tubular plunger 4 with a shock-receiving plate 3 at the outer end fits within the cylinder 2. Instead of the shock-receiving plate 3 another member may be attached to the plunger 4. A hollow tubular cushion 5 made of synthetic rubber, polyurethane resin for example, is held within the cylinder 2.

The cushion 5 consists of a relatively straight portion A which decreases in diameter from the mid-point of the cushion 5 in an upward direction. A curved portion B extends downwardly of the mid-point of the cushion and is bent inward at the bottom edge 5B. The top edge 5A is fitted to the plunger 4 by a stop screw 6 threaded into the end 4A of the plunger 4 from inside of the cushion 5. A stopper 7 with a head 7A is provided on a base plate 1, and the stopper 7 is positioned at the bottom open edge 5B of the cushion 5, as shown. On the internal wall of the cylinder 2, rows of saw-teeth 8 are provided in vertical arrangement. Each tooth 8 is elevated toward the depth of the cylinder 2 to thereby form a slope at the upper open side. The plunger 4 carries a ring 9 made of a hard elastic material such as silicone rubber and the ring meshes with each tooth 8. The ring has some degree of elasticity which enables it to slide over the teeth 8 upon the downward stroke of the plunger, as explained more fully below. The ring 9 is elastically deformed at the position of the saw-teeth 8 and proceeds over them. Also, an O-ring 12 is provided at the open end of the cylinder 2 between the outside wall of the plunger 4 and the inside of the cylinder. In the middle part of the stopper 7 an air exhaust hole 10 is provided, and a similar air exhaust hole 11 is provided in the cylinder 2 adjacent the base plate 1.

Figure 8:
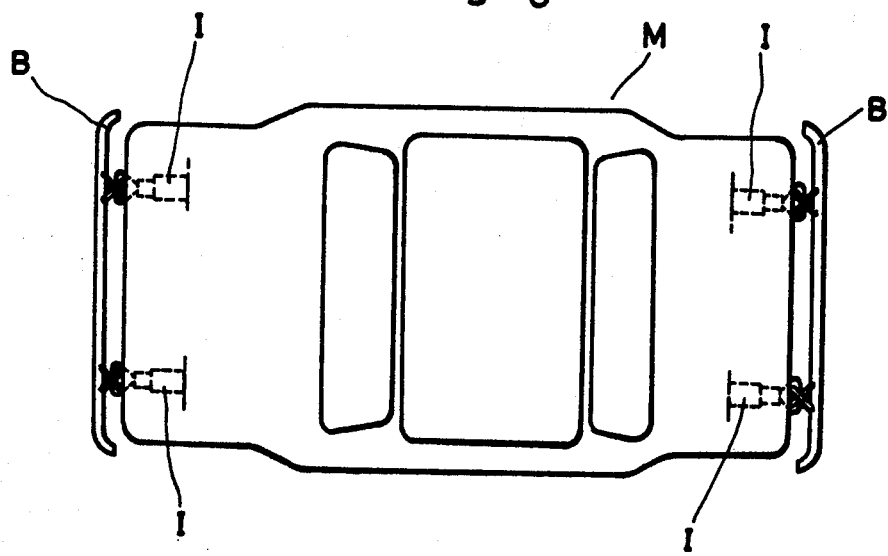
FIG. 8 is a plan view of an automobile equipped with the shock absorbers of the present invention.

In the illustrated embodiment of FIGS. 1–3, the plunger of the shock absorber may be attached to the bumper B of an automobile by means of link members, as shown best in FIG. 8. The base plate 1 is fitted to the body M of an automobile, as shown.

When the shock-receiving plate 3 is hit, the plunger 4 is pushed into the cylinder 2. In the additional stage the edge 5B of the curved portion B of the cushion 5 is deformed inwardly of the cushion 5 and such deformation is arrested by the head 7A of the stopper 7. Thereupon the displacement of the edge 5B is hindered and instead the curved portion B is deformed, as shown in FIG. 2. Next under the pressure of the plunger 4, the straight portion A is progressively buckled and crushed, as shown in FIG. 3. As the plunger 4 moves over its stroke, the volume of the cylinder 2 diminishes and in consequence the air sealed within the cushion 5 and the cylinder 2 is discharged into the atmosphere through the exhaust ports 10 and 11.

When the plunger 4 moves into the cylinder 2, the ring 9 slides along the slope of each tooth 8 with very little resistance. However, when the pressure acting on the shock-receiving plate 3 is removed, the ring 9 engages the abutment surface of the teeth 8 and the resultant resistance hinders or inhibits a sudden recovery of the cushion 5 from its deformed state.

Figure 4:
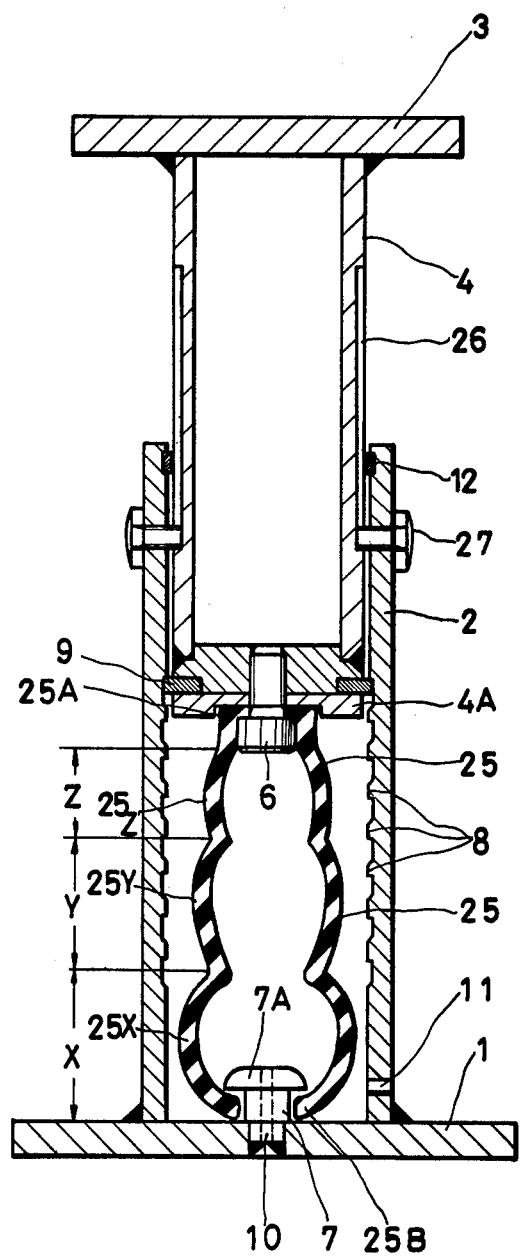
FIG. 4 is a longitudinal sectional view of another shock absorber according to the present invention.
Figure 5:
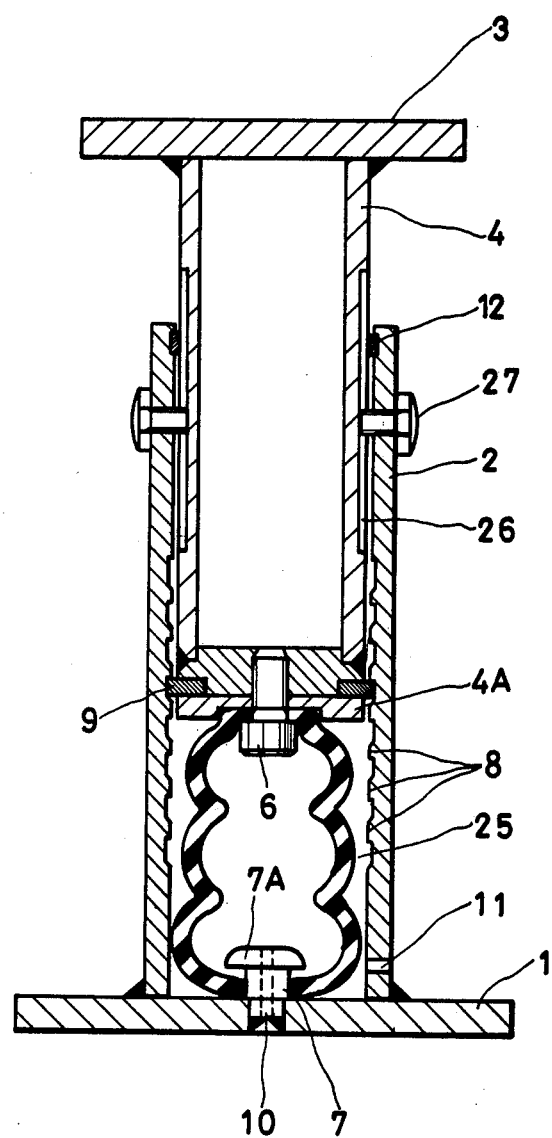
FIG. 5 is a longitudinal sectional view of the shock absorber of FIG. 5 with the cushion in a deformed state.
Figure 6:
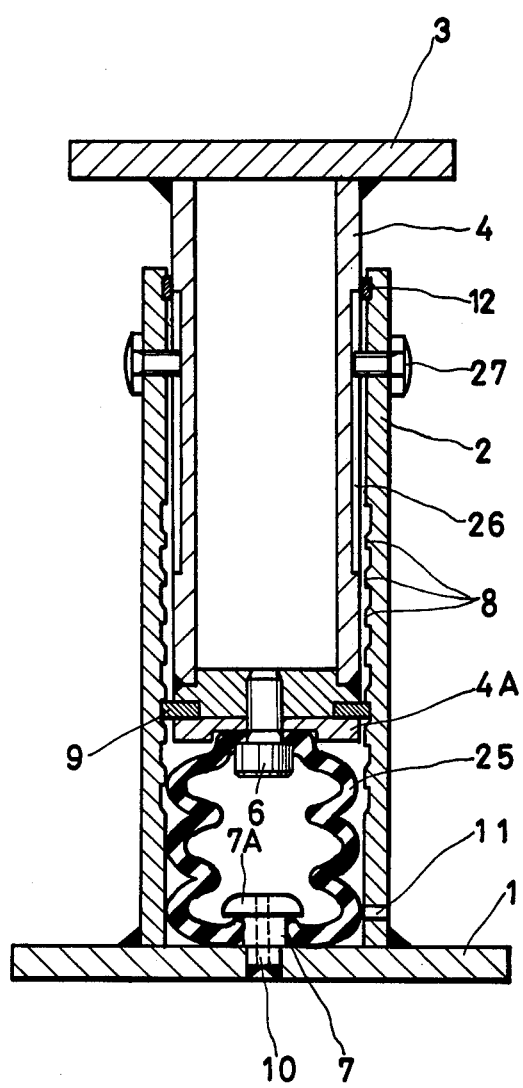
FIG. 6 is a longitudinal sectional view of the shock absorber of FIG. 5 with the cushion in its advanced state of deformation.

FIGS. 4 to 6 illustrate a second embodiment of the present invention wherein the main difference when compared to FIGS. 1 to 3 is in the profile of the cushion. Like parts are identified by like reference numerals and the detailed description of such like parts is the same as above.

The cushion 25 used in the embodiment of FIGS. 4 to 6 is a hollow body composed of three dissimilar portions with the same wall thickness but different outer diameters. The bottommost tubular portion 25X has the greatest diameter, and the middle tubular portion 25Y diminishes following the top tubular portion 25Z. The top open part 25A is supported by a stop screw 6 attached to the end 4A of the plunger 4. The bottom end 25B constitutes an inwardly bent portion, and a stopper 7 is located on the base plate 1, as shown in FIGS. 4–6.

In the embodiment of FIGS. 4–6, a slide groove 26 is provided in the longitudinal direction on the plunger 4 and the end of a slider 27 is fitted to the cylinder 2 so that it extends into the groove 26 thereby providing a vertical linear guide. Removal of the plunger 4 is prevented by the end of the slide groove 26 arresting the slider 27. At the same time, the plunger 4 holds the cushion 25 in a slightly compressed state thereby causing the pressure of the cushion 25 to act on the plunger 4 and thus eliminate any vertical play between the plunger 4 and the cylinder.

When a shock acting on the shock-receiving plate 3 causes the plunger 4 to push into the cylinder 2, the edge 25B of the tubular portion 25X of the cushion 25 inwardly buckles and deforms into the cushion 25. As a result of the edge being arrested by the head 7A of the stopper 7, the tubular portion 25X ceases to deform. As shown in FIGS. 5 and 6, the progressive buckling and deformation of the respective portions 25X, 25Y and 25Z produce a very long shock of the plunger 4.

The stroke of the plunger 4 causes a decrease in the volume of the cylinder and in consequence the air sealed in the cushion 5 and in the cyclinder 2 is discharged to the outside through the exhaust ports 10 and 11.

When the plunger 4 moves into the cylinder 2, the ring 9 is guided along the slope of each tooth 8 with little resistance to the plunger 4. On the other hand, when the shock acting on the shock-receiving plate 3 is removed, the ring 9 is arrested on the elevated side of each tooth 8 which develops a resistance. This resistance hinders sudden recovery and assures gradual reversion to the original position. The working principle is identical to the shock absorber of the preceding embodiment.

Figure 7:
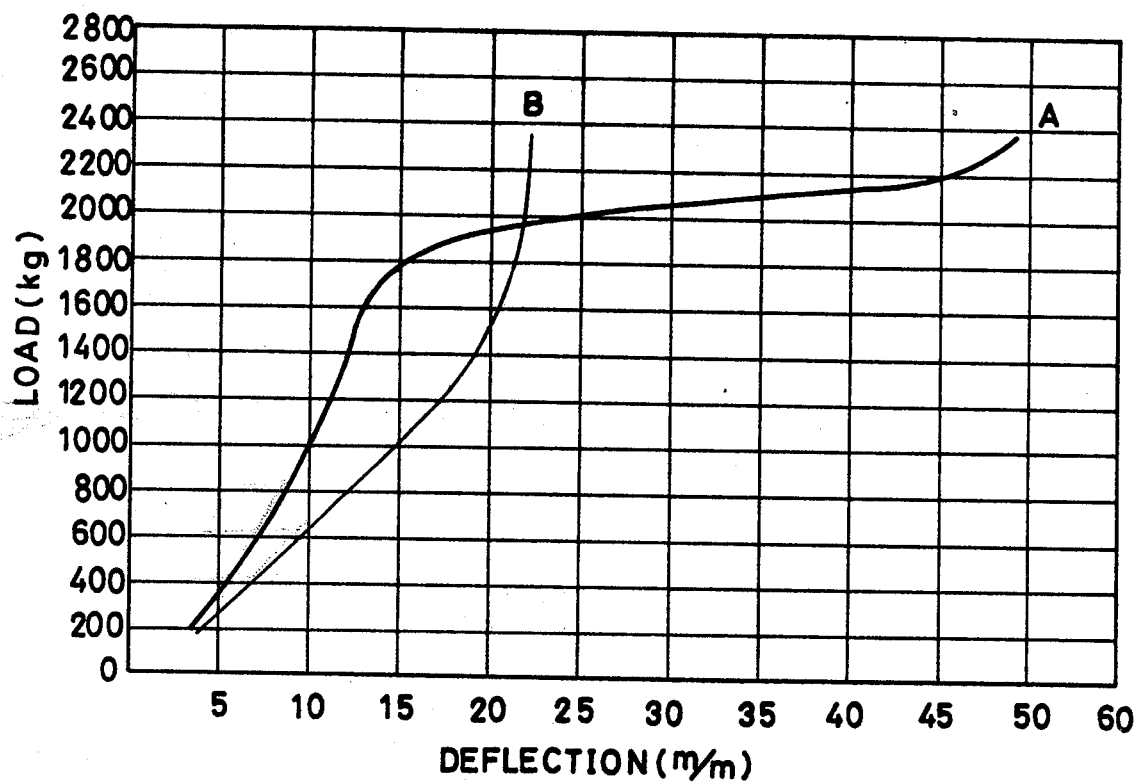
FIG. 7 is a load-deflection curve of the shock absorber shown in FIGS. 4–6.

FIG. 7 illustrates a load-deflection curve for the shock absorber of the second embodiment. The plot has been experimentally obtained under the following conditions:

| Total length of cushion 25 | | 7.5 cm (effective length: 6.8 cm) |
|---|---|---|
| Tubular portion 25X | height | 2.6cm |
| | maximum diameter | 3.2 cm |
| Tubular portion 25Y | height | 2.3 cm |
| | maximum diameter | 2.7 cm |
| Tubular portion 25Z | height | 1.7 cm |
| | maximum diameter | 1.2 cm |
| Thickness of cushion | | 3 mm |
| Bore of cylinder | | 3.6 cm |

Under the above conditions the load-deflection characteristic is represented by the curve A and therefrom it is seen as compared with the characteristic curve B for nearly the same tubular body as the part 25Y that a remarkably greater energy can be absorbed.

The application of the present shock absorber is not limited to the above embodiments. The required condition is only that the profile of the cushion be selected such that the buckling of the cushion is effectively utilized to give an ample stroke to the plunger. Thus with a straight load-strain characteristic of shock absorption, the device when applied to a bumper of an automobile can prevent a sudden shock from acting on the car body. Meanwhile the teeth provided in the cylinder impart resistance such that a sudden reaction of the plunger as it reverts to the original position with recovery of the cushion from compression is prevented. Thus, when applied to an automobile the device safely prevents a sudden reaction of the car body under shock.

The profile of the cushion in this invention is not limited to those illustrated in the drawings. Instead the profile may be a tubular body of any profile, the only requirement being that the cushion does not elastically deform but permits sufficient buckling.

The invented device is applicable not only for shock-absorbing of the automobile but also for many other uses as a simple, effective means of absorbing shock.

What is claimed is:

1. A shock absorber comprising a cylinder with a closed lower end, a hollow tubular cushion fabricated of elastic material within the cylinder, an inwardly bent edge formed on the cushion at the lower end thereof, a stopper on the cylinder extending into the lower end of the cushion and engaged by the inwardly bent edge thereof to prevent movement of the cushion beyond a specified limit, a plunger above the cushion slidably fitted within the cylinder, and resistance means between the cylinder and the plunger for inhibiting sudden reversion of the plunger to its original position while providing little resistance on the down stroke of the plunger whereby movement of the plunger into the cylinder causes the cushion to buckle and the resistance means prevents the plunger from suddenly reverting to its original position by the elasticity of the cushion material, and wherein the resistance means comprises saw-teeth arranged longitudinally on the inside wall of the cylinder and at least one elastic ring on the plunger that meshes with the saw-teeth as the plunger and the cylinder move relative to one another, each saw-tooth having an inwardly and downwardly sloping upper surface and a lower surface at substantially right angles to the inside wall of the cylinder.

2. A shock absorber as in claim 1 wherein the cushion is variable in diameter so that isolated bending deformation takes place at each varied-diameter portion.

3. A shock absorber as in claim 2 wherein the cushion comprises a straight section which linearly changes in diameter from the mid-portion of the cushion in an upward direction, and a curved section extending downwardly from the mid-portion of the cushion to an inwardly bent bottom edge.

4. A shock absorber as in claim 2 wherein the cushion consists of three tubular sections different in diameter and the bottom edge is bent inwardly.

5. A shock absorber as in claim 1 wherein the top open end of the cushion bears against the lower end of the plunger, and a stopper attached to the lower end of the plunger to arrest inward movement of the cushion at the top open end thereof.

6. A shock absorber as in claim 1 wherein an air port is formed in the cylinder near the bottom thereof, and a second air port is provided in the stopper to vent the cushion.

7. A shock absorber as in claim 1 wherein the plunger extends into the cylinder a sufficient amount in its original position to hold the cushion within the cylinder in a slightly compressed state.

* * * * *